No. 700,125. Patented May 13, 1902.
E. KEMPSHALL.
SPINNING ROLL.
(Application filed Apr. 10, 1902.)
(No Model.)

Witnesses:—
R. S. Strahan
R. W. Pittman

Inventor,
Eleazer Kempshall.
By his Attorney
F. H. Richards.

UNITED STATES PATENT OFFICE.

ELEAZER KEMPSHALL, OF BOSTON, MASSACHUSETTS.

SPINNING-ROLL.

SPECIFICATION forming part of Letters Patent No. 700,125, dated May 13, 1902.

Application filed April 10, 1902. Serial No. 102,241. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Spinning-Rolls, of which the following is a specification.

This invention relates to rolls such as used in spinning-machines; and its object is to improve the construction of the roll, to the end of increasing its efficiency and durability.

Figure 1:
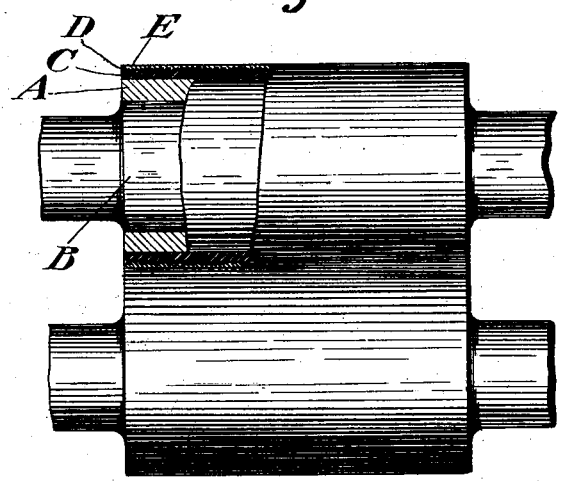
Figure 2:
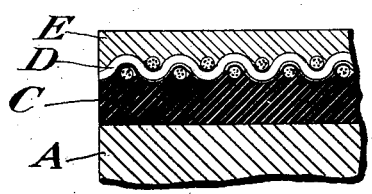
Figure 3:
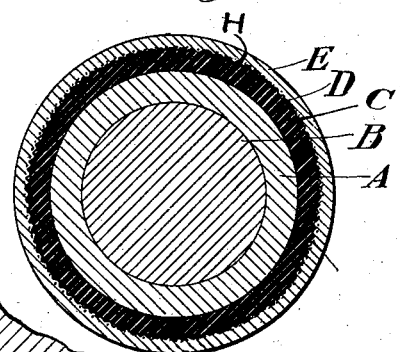
Figure 4:
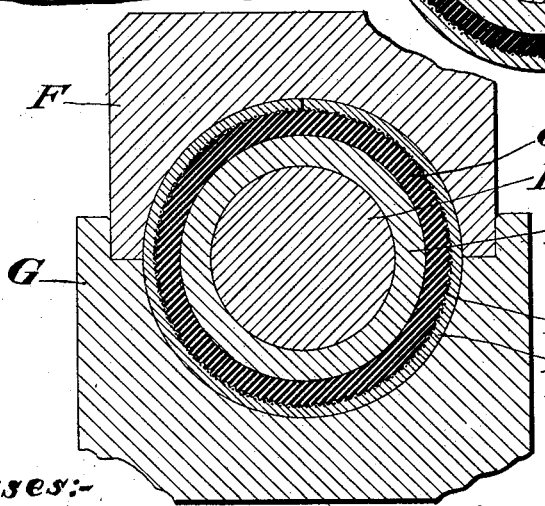

In the accompanying drawings, Figure 1 is a side view, partly in section, of my improved roll, which is shown diagrammatically as forming one of a pair of spinning-rolls. Fig. 2 is an enlarged fragmentary longitudinal section illustrating details of construction. Fig. 3 is a cross-section of my improved roll, and Fig. 4 is a diagram illustrative of the process of manufacture.

In the several views similar parts are designated by similar characters of reference.

Upon a cylinder A, preferably of cast-iron and preferably hollow for the reception of an arbor B, I place a covering of soft rubber C, preferably highly vulcanized, and over this rubber I wrap a layer compounded of fabric D and celluloid E, said compound layer being preferably thinner than the soft-rubber layer and the celluloid forming the periphery of the roll. The woven fabric and celluloid are previously made in sheet form and thoroughly compacted under heat and great pressure, the fabric becoming embedded in or keyed to the celluloid. The parts thus assembled I preferably place between heating and compressing dies F and G, whereby they are subjected to great pressure and given their final form, the heat softening the celluloid, so that it is enabled to conform to the shape of the dies, and the pressure being maintained until the celluloid cools and hardens, so that the rubber A is in a state of permanent compression within the cylindrical shell D E of celluloid and fabric. Upon removal from the dies the roll may, if desired, be trued in a lathe or otherwise. The roll thus formed is elastic owing to the presence of the celluloid and the backing of soft rubber and is also firm owing partly to the presence of the fabric and the celluloid and partly to the fact that the shell holds the backing under compression. The celluloid is highly wear-resisting, and neither the celluloid nor the rubber is affected by moisture or from atmospheric causes. The covering of the roll is a non-conductor of electricity, which is a desideratum in this class of devices. The celluloid tends to wear smooth and to keep its cylindrical form; but if it should become uneven from any cause it can be again trued in a lathe. The rubber may be cemented upon the iron cylinder A, and cement is preferably applied between said rubber and the fabric lining D, which forms a component of the hard shell. Owing partly to the use of the cement and partly to the compressive tendency of the shell or casing there is no liability of either the latter or the rubber layer C slipping around the core-cylinder A.

The celluloid which is wrapped around the rubber envelop becomes welded at its meeting edges under the action of the heating and compressing dies F and G, so that there is no overlapping seam, as is the case in some spinning-rolls; but a perfectly smooth and even cylindrical surface is produced. It will also be seen that owing to its high degree of compactness and stability my roll successfully withstands the pressure to which it is subjected in use and during either dry or damp weather never becomes loose upon the iron cylinder A. It is not essential in all cases that the fabric be cemented to the rubber jacket C. Owing to the presence of the fabric the celluloid is toughened to a phenomenal degree and does not become cracked or abraded under severe usage.

In using the term "celluloid" I mean to include all material of the pyroxylin class. It is not essential in all cases that a single layer of celluloid or a single layer of fabric be employed, and other variations may be resorted to within the scope of my improvements.

Having described my invention, I claim—

1. A roll consisting of a core, a layer of soft rubber thereon, and a shell upon said soft rubber consisting of celluloid in which fibrous material is embedded, said shell holding said soft rubber under compression.

2. A roll consisting of a core, a layer of soft rubber cemented thereon, and a compound layer forming a shell upon said soft rubber; said shell consisting of woven fabric and celluloid and holding said soft rubber under compression.

3. A roll consisting of a core, a layer of soft rubber cemented thereon, and a compound layer forming a shell upon said soft rubber; said shell consisting of woven fabric and celluloid, the latter forming the periphery of the roll, said shell holding said soft rubber under compression.

4. A roll consisting of a core, a layer of yielding material thereon, and a hard shell holding said yielding layer under compression.

5. A roll consisting of a core, a layer of yielding material thereon, and a hard shell of waterproof material holding said yielding layer under compression.

6. A roll consisting of a core, a layer of soft rubber thereon, and a shell holding said soft-rubber layer under compression; said shell consisting of waterproof plastic material compounded with fabric.

7. A roll comprising a core, a soft rubber layer thereon, a layer of fabric, provided with a facing of celluloid, holding said rubber layer under compression.

8. A roll comprising a core, a soft-rubber layer thereon, and a shell holding said rubber under compression; said shell comprising a layer of woven fabric and a facing of celluloid.

9. A roll comprising a core, a layer of soft rubber thereon, and a shell consisting of a sheet of celluloid having fabric embedded therein and wrapped around said soft rubber and welded together at its edges; said shell holding said soft rubber under compression.

ELEAZER KEMPSHALL.

Witnesses:
B. C. STICKNEY,
WM. H. DE LACY.